United States Patent [19]
Hakki

[11] 3,849,738

[45] Nov. 19, 1974

[54] MULTILAYER ANTIREFLECTION COATINGS FOR SOLID STATE LASERS

[75] Inventor: Basil Wahid Hakki, Summit, N.J.

[73] Assignee: Bell Telephone Laboratories, Incorporated, Murray Hill, N.J.

[22] Filed: Apr. 5, 1973

[21] Appl. No.: 348,161

[52] U.S. Cl............... 331/94.5 H, 350/164, 357/18
[51] Int. Cl.............................................. H01s 3/00
[58] Field of Search...................... 350/1, 164, 166; 331/94.5 H

[56] References Cited
UNITED STATES PATENTS
3,301,625   1/1967   Ashkin et al....................... 350/150

OTHER PUBLICATIONS
Ettenberg et al.: "Control of Facet Damage in GaAs Laser Diodes," Applied Physics Letters, Vol. 18, pp. 571–573, June 15, 1971.

Baumeister: "Multiple Filters," Notes for Summer Course in Modern Methods of Optical Design, Institute of Optics, The University of Rochester, Summer, 1963, pp. 20–26 and 20–33 through 20–36.

*Primary Examiner*—Edward S. Bauer
*Attorney, Agent, or Firm*—M. J. Urbano

[57]     ABSTRACT

A solid state laser is provided on at least one mirror surface with an antireflection coating comprising at least two contiguous layers, one of which has a refractive index greater than, and the other of which has a refractive index less than, the square root of the refractive index of the active region of the laser. The AR coating is impedance matched to the active region by proper choice of the thicknesses of the layers. In a preferred embodiment the AR coating for an AlGaAs double heterostructure junction laser comprises an innermost layer of ZnS and an outermost layer of $Al_2O_3$.

11 Claims, 3 Drawing Figures

PATENTED NOV 19 1974 3,849,738

MULTILAYER ANTIREFLECTION COATINGS FOR SOLID STATE LASERS

BACKGROUND OF THE INVENTION

This invention relates to solid state lasers and, more particularly, to multilayer antireflection (AR) coatings applied to a mirror of such lasers.

Solid state lasers, such as GaAs double heterostructure junction lasers, find varied applications such as, for example, as a c.w. carrier source in an optical communication system or as a pulsed, high power source in a micrographics system of the type described by D. Maydan et al. in U.S. Pat. No. 3,720,784 issued on Mar. 13, 1973. In either case, however, the motivation for applying antireflection coatings to laser structures may involve one or more of the following factors: (1) suppression of internal lasing modes, and the increase of the optical coherence width along the junction in an external cavity arrangement; (2) extraction of the laser power predominantly from one side of the laser, and hence increasing the useful external efficiency without the use of complicated optics to combine external optical beams; (3) passivation of the laser mirrors, and protection against chemical or photochemical reactions with the ambient; and (4) increasing the threshold for catastrophic mirror damage.

In the prior art quarter-wavelength-thick SiO films have been primarily relied upon to form AR coatings on GaAs junction lasers. It has been found, however, that SiO films tend to adhere poorly to GaAs and moreover are quite unstable in a humid environment.

SUMMARY OF THE INVENTION

In accordance with one embodiment of my invention, a solid state laser is provided on at least one mirror surface with an antireflection coating comprising at least two contiguous layers, one of which has a refractive index greater than, and another of which has a refractive index less than, the square root of the refractive index of the active region of the laser. The AR coating is impedance matched to the active region by proper choice of the thicknesses of the layers.

In a preferred embodiment for GaAs junction lasers (e.g., AlGaAs double heterostructures), I have found that an AR coating comprising, in combination, contiguous layers of ZnS and $Al_2O_3$ provides the desired low reflectivity and chemical stability. In view of the need for a chemically stable film and the requirement of low reflectivity, which necessitates film thickness control of about ±1 percent, evaporated $Al_2O_3$ was chosen as one constituent of the AR coating. However, to compensate for the low refractive index of evaporated $Al_2O_3$ films ($n = 1.66$), the other constituent of the AR coating was chosen to be ZnS ($n = 2.27$ at 9,000 A). Such $ZnS/Al_2O_3$ films have been evaporated on GaAs and, by the proper choice of thicknesses, the Fresnel reflectivity for normal incidence was made to be less than about $10^{-4}$ at the GaAs laser wavelength. The Fresnel reflectivity remained below $10^{-3}$ over a 500 A bandwidth. In addition, tests indicated that when the $Al_2O_3$ film was the outermost component of the AR coating, it formed a chemically stable film that protected the laser against humidity and acid etches.

BRIEF DESCRIPTION OF THE DRAWING

My invention, together with its various features and advantages, can be more easily understood from the following more detailed description taken in conjunction with the accompanying drawing, in which.

DETAILED DESCRIPTION

For simplicity, the following description is directed to multilayer AR coatings for GaAs junction lasers. However, this embodiment is chosen for the purposes of illustration only and is not intended to limit the scope of my invention.

Structure

Figure 1:
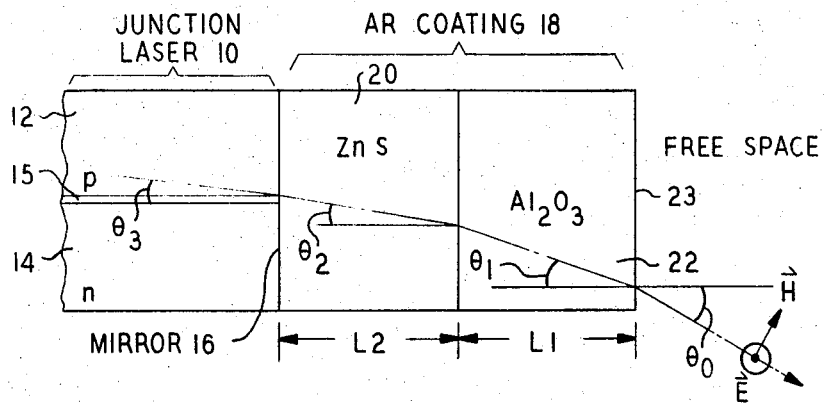
FIGS. 1 and 2 are schematic side views of illustrative embodiments of my invention.

Turning now to FIG. 1, there is shown schematically an illustrative embodiment of my invention, a junction laser 10 comprising contiguous p- and n-type regions 12 and 14 forming therebetween a planar active region 15 in which radiative recombination of holes and electrons occurs to produce stimulated emission of radiation. The laser may illustratively be a GaAs homostructure, in which case active region 15 is a p-n homojunction, or, alternatively, one of a variety of heterostructures, in which case active region 15 is a narrow bandgap semiconductor region (e.g., GaAs) which includes a p-n homojunction or heterojunction and which is sandwiched between relatively wider bandgap regions (e.g., AlGaAs). Heterostructure junction lasers include the following: single and double heterostructures as described by I. Hayashi in copending application Ser. No. 33,705 filed on May 1, 1970 (now U.S. Pat. No. 3,758,875, issued on Sept. 11, 1973); double-double heterostructures as described by I. Hayashi in U.S. Pat. No. 3,691,476 issued on Sept. 12, 1972; and PpnN double heterostructures as described by L. A. D'Asaro et al. in copending application Ser. No. 203,709 filed on Dec. 1, 1971 (now abandoned).

In any event, laser 10 is typically cleaved to form a mirror 16 which is perpendicular to the plane of active region 15. In addition, in accordance with one embodiment of my invention, mirror 16 is provided with an AR coating 18 comprising an innermost layer 20 of ZnS contiguous with mirror 16 and an outermost layer 22 of $Al_2O_3$ contiguous with ZnS layer 20. Illustratively, layers 20 and 22 are thin films formed by evaporation of the constituents of the respective layers. Note that the thicknesses of the layers shown in FIG. 1 are exaggerated for clarity of illustration.

Measurements of the refractive indices of the separate ZnS and $Al_2O_3$ evaporated films indicate that at 9,000 A, a typical lasing wavelength of a semiconductor laser having a GaAs active region, the refractive indices are 2.27 and 1.66, respectively. The refractive index of GaAs at 9,000 A on the other hand is about 3.59. Note that the square root of 3.59 is about 1.9 so that the square root of refractive index of GaAs lies between the refractive indices of ZnS and $Al_2O_3$. From these indices the optical impedances for the various bulk materials can be calculated as 105 ohms for GaAs, 166 ohms for ZnS and 227 ohms for $Al_2O_3$. Well known transmission line equations can readily be used to adjust the film thicknesses to give nearly perfect impedance matching. Equivalently, Smith charts can be used with considerable accuracy, and in this case are more convenient. Whichever method is used, impedance matching is obtained for normal incidence when $$L_1 = 0.166\lambda_1 = 0.1\lambda_o \qquad (1)$$

$$L_2 = 0.14\lambda_2 = 0.0615\lambda_o \qquad (2)$$

where $L_1$ and $L_2$ are the thicknesses of the $Al_2O_3$ and ZnS layers, respectively, $\lambda_1$, $\lambda_2$, and $\lambda_o$ are the optical wavelengths in the $Al_2O_3$, ZnS layers and free space, respectively, and the numerical multipliers are obtained from Smith charts, to provide nearly perfect impedance matching.

For this choice of thicknesses, the wave impedance (as obtained from Smith charts) at the interface between $Al_2O_3$ layer 22 and ZnS layer 20 in the direction of free space is $\zeta_1 = 164 + j75$ ohms, and the impedance at the ZnS/GaAs interface in the direction of free space is 106 ohms. Since the impedance of GaAs is 105 ohms, the Fresnel power reflectivity for normal incidence is $2.5 \times 10^{-5}$.

Figure 2:
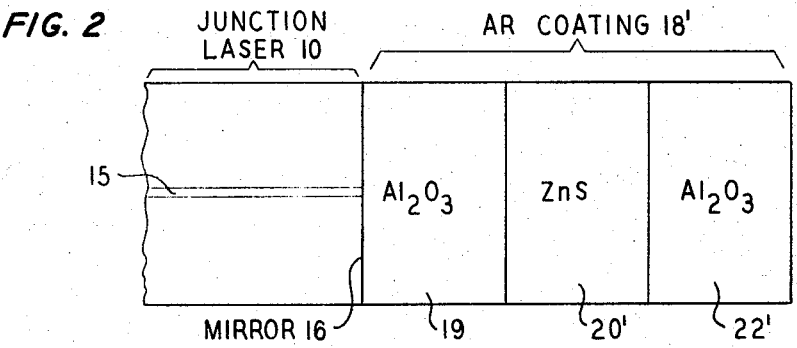

An alternative embodiment of my invention, which reduces the likelihood of reaction between GaAs and ZnS, includes as shown in FIG. 2, an AR coating 18' comprising a layer 19 of $Al_2O_3$ formed on GaAs mirror 16, followed by a layer 20' of ZnS formed on layer 19, and then a layer 22' of $Al_2O_3$ formed on layer 20' and interfacing with air. For zero Fresnel reflectivity at normal incidence the thicknesses of these layers should be $0.0797\lambda_1$, $0.082\lambda_2$, and $0.078\lambda_1$, respectively, where $\lambda_1$ and $\lambda_2$ are the optical wavelengths in $Al_2O_3$ layer 22' and ZnS layer 20' respectively.

In addition, AR films in accordance with another aspect of my invention can be constructed in such a way as to suppress higher order modes transverse to the junction plane, i.e., to reduce the effect of the finite angular spread of power within the waveguide. Thus, in an AlGaAs double heterostructure laser in which the waveguide height (thickness of the active region) is larger than 1.0μm, higher order modes transverse to the junction plane can exist. In order to suppress these higher order modes, the AR film is designed to provide a finite reflectivity for angles of incidence close to normal, thereby favoring the zero-order (fundamental) mode, but reflectivities that diminish to zero at some prescribed angle of incidence which corresponds to that of the undesired higher order mode to be suppressed. This low mirror reflectivity for the higher order mode reduces the amount of feedback necessary to sustain its oscillations, thereby effectively suppressing the undesired mode.

For example, in the embodiment of FIG. 1 a TE mode (electric field in the plane of region 15) can have zero Fresnel reflectivity at an angle of 20° in free space when the thickness of the ZnS film is $0.134\lambda_2$ and the thickness of the $Al_2O_3$ film is $0.168\lambda_1$. The choice of the angle at which the Fresnel reflectivity is to be zero is readily determined by techniques well known in the art from the waveguide height and the propagating mode.

In general, for the TE mode the impedance $Z$ of a medium (layer) to a light wave incident at some angle $\theta$ is $$Z_i(\theta) = Z_i(0)/\cos \theta_i \qquad (3)$$

where $Z_i(0)$ is the impedance of the medium for normal incidence in medium $i$. Similarly, the electrical length $L(\theta)$ of each layer is $$L_i(\theta) = L_i \cos \theta_i/\lambda_i \qquad (4)$$

where $\lambda_i$ is the wavelength of the light wave in medium $i$ and $\theta_i$ is the angle of propagation in medium $i$. The angles of propagation in each medium (layer) are obtained from Snell's law, i.e., $$\sin \theta_1/\sin \theta_o = n_o/n_1 \qquad (5)$$

where $n_1$ is the refractive index of medium $i$. Hence, once $\theta_o$ is defined, all the remaining angles $\theta_i$ and impedances $Z_i$ are determinable. Well known use of Smith charts enables one skilled in the art to determine $L_1$ and $L_2$ for zero reflectivity at $\theta_o$.

Fresnel and Mode Reflectivities

Since the bandgap of GaAs at 300° K is 1.435 eV (8,620 A) reflectivity measurements for $\lambda \geq 8,620$ A were complicated by transmission through the GaAs and subsequent reflection from the back surface, i.e., from the mirror (not shown) opposite to mirror 16. Therefore, measurements of AR films were more conveniently done at $\lambda < 8,620$ A where the high internal absorption in the GaAs precluded any residual reflectivity from the back surface.

Figure 3:
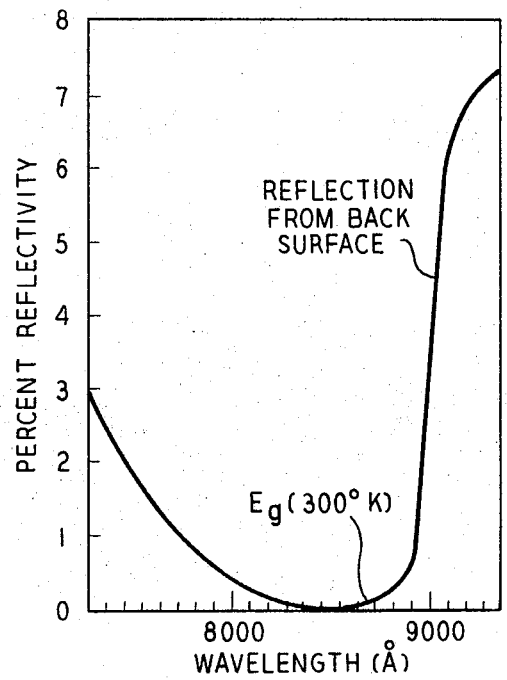
FIG. 3 is a graph of percent reflectivity versus wavelength for a specific embodiment of my invention of the type depicted in FIG. 1.

FIG. 3 is an example of normal incidence Fresnel reflectivity as a function of wavelength from a ZnS/$Al_2O_3$ Ar coating as shown in FIG. 1. The thicknesses of the films were 520 A and 850 A for ZnS and $Al_2O_3$, respectively. The minimum reflectivity in FIG. 3 was smaller than the resolving accuracy which was about $10^{-4}$. In addition, the Fresnel reflectivity stayed below $10^{-3}$ over a 500 A bandwidth.

Within the laser waveguide, the mode reflectivity, which is higher than the Fresnel reflectivity, is determined from the following relationship given by M. Ettenberg et al. in *Applied Physics Letters*, Vol. 18, pages 571 et seq. (1971):

$$P_{AR}/P = (R/R_{AR})^{1/2} (1-R_{AR}/1-R) \qquad (5)$$

where $P_{AR}$ and $P$ are, respectively, the powers being emitted, in the stimulated regime, from the AR coated mirror 16 and from the opposite mirror (not shown) which has no AR coating; $R$ is the mode reflectivity of the uncoated laser mirror and is taken to be 0.32; and $R_{AR}$ is the mode reflectivity of the AR coated mirror 16 of the laser. Because the AR coating 18 was designed to give minimum Fresnel reflectivity for normal incidence, the lowest reflectivity was obtained for the zero-order mode. However, it is well known that it is difficult to maintain a pure zero-order mode in a simple double heterostructure laser if the waveguide height exceeds 1 μm. Therefore, for waveguide heights in excess of 1 μm I used a PpnN double heterostructure of the type described in L. A. D'Asaro application supra. This laser comprised a p-n homojunction in a GaAs active region disposed between a pair of heterojunctions formed at interfaces with AlGaAs. The GaAs active region was 2.0 µm thick: 1.35 µm of p-GaAs and 0.65 µm of n-GaAs. The electronic gain in such a structure is highest for the zero-order mode. When my $ZnS/Al_2O_3$ AR coatings were applied on such laser structures the zero-order mode reflectivity was as low as $3 \times 10^{-3}$.

For conventional double heterostructure lasers of the type described in I. Hayashi application, supra, with active regions less than 1 µm thick, the zero-order mode reflectivity was typically $7 \times 10^{-3}$ or higher, and the mode reflectivity of the AR coated laser increased with decreasing waveguide height (active region thickness).

Passivating Properties of the $ZnS/Al_2O_3$ AR Coating

I have found, in addition, that forming the $Al_2O_3$ film as the outermost layer, which is exposed to air, protects the ZnS and the GaAs from the ambient. In one test, the AR coating was acid resistant as confirmed by putting phosphoric acid on the exterior surface 23 (FIG. 1). The concentrated phosphoric acid did not affect the GaAs cleaved mirror 16, but at 300° K dissolved the $Al_2O_3$ film at the rate of 12 A/min. This rate of dissolution was obtained by measuring the shift in wavelength at which the reflectivity is a minimum.

In another test, when an $Al_2O_3$ protected piece of GaAs was put in water at 300° K, no visible change in film quality was detected after 24 hours. Moreover, GaAs lasers protected by an $Al_2O_3$ film were boiled in water for 4 hours without a marked change in either lasing threshold or stimulated efficiency.

Lasers coated with $ZnS/Al_2O_3$ AR films have been operated on a pulsed basis in the aforementioned micrographics system at optical power densitites as high as $4 \times 10^6$ W/cm$^2$. Results obtained in the micrographics system indicate that no observable photochemical reactions took place on the AR coated laser mirrors at these high flux densities. Thus, I concluded from the above-mentioned results that the $ZnS/Al_2O_3$ AR film is a chemically stable coating that protects the GaAs mirrors from the ambient.

It is to be understood that the aove-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, my invention finds application with numerous materials of the form $A_xGa_{1-x}As_{1-y}B_y$ where A is a group III(a) element, B is a group V(a) element, $0 \leq x < 1$, $0 \leq y < 1$, for example, GaAs ($x = y = 0$) and AlGaAs ($A = Al, y = 0$). In the use of a two layer AR coating of ZnS ($n = 1.66$) and $Al_2O_3$ ($n = 2.27$), impedance matching can be attained for any active medium having a refractive index between $2.75 = (1.66)^2$ and $5.15 = (2.27)^2$. In addition, one suitable substitute for ZnS is CdS ($n = 2.35$ at 9,000 A) and for $Al_2O_3$ is fused silica ($n = 1.45$ at 9,000 A), although $ZnS/Al_2O_3$ is preferred for the previously given reasons for GaAs lasers.

What is claimed is:

1. In a solid state laser, a body comprising
an active region capable of stimulated emission of radiation when suitably pumped,
said body having at least two parallel surfaces forming a resonator for sustaining said radiation, and
an antireflection coating formed on one of said at least two parallel surfaces,
characterized in that said coating comprises two contiguous layers of material, one of which has a refractive index less than, and one of which has a refractive index greater than, the square root of the refractive index of said active region, the thicknesses and refractive indices of said layers being mutually adapted to impedance match said coating to said active region.

2. The body of claim 1 wherein said active region comprises a material of the form $A_xGa_{1-x}As_{1-y}B_y$, where A is a group III(a) element, B is a group V(a) element, $0 \leq x < 1$ and $0 \leq y < 1$.

3. The body of claim 2 wherein said coating comprises a layer of ZnS contiguous with a layer of $Al_2O_3$.

4. The body of claim 3 wherein said active region includes a p-n junction.

5. The body of claim 1 wherein the thicknesses of said layers are adapted to produce approximately zero Fresnel reflectivity at some non-normal angle of incidence which at least one preselected transverse mode of said radiation makes with said one of said at least two parallel surfaces.

6. In a semiconductor junction laser, a semiconductor body comprising
an active region of material of the form $A_xGa_{1-x}As_{1-y}B_y$, where A is a group III(a) element, B is a group V(a) element, $0 \leq x < 1$ and $0 \leq y < 1$,
a planar p-n junction formed in said active region,
said body having at least two parallel surfaces perpendicular to the plane of said junction and forming a resonator for sustaining stimulated radiation generated when said junction is forward biased above the lasing threshold, and
an antireflection coating formed on one of said at least two parallel surfaces,
characterized in that said coating comprises a layer of ZnS contiguous with a first layer of $Al_2O_3$.

7. The body of claim 6 wherein said active region comprises GaAs, and the thicknesses of said first $Al_2O_3$ layer and said ZnS layer are approximately $0.1\lambda_o$ and $0.0615\lambda_o$, respectively, where $\lambda_o$ is the free space optical wavelength of said radiation.

8. The body of claim 6 wherein said first $Al_2O_3$ layer is the outermost layer.

9. The body of claim 8 wherein said coating further includes a second $Al_2O_3$ layer disposed between said one of said at least two parallel surfaces and said ZnS layer.

10. The body of claim 9 wherein said material comprises GaAs and the thicknesses of said second $Al_2O_3$ layer, said ZnS layer and said first $Al_2O_3$ layer are approximately $0.0797\lambda_1$, $0.082\lambda_2$ and $0.078\lambda_1$, respectively, where $\lambda_1$ is the optical wavelength of said radiation as measured in said first $Al_2O_3$ layer and $\lambda_2$ is the optical wavelength of said radiation as measured in said ZnS layer.

11. The body of claim 6 wherein the thicknesses of said ZnS layer and said first $Al_2O_3$ layer are adapted to produce approximately zero Fresnel reflectivity at some non-normal angle of incidence which at least one preselected transverse mode of said radiation makes with said one of said at least two parallel surfaces.

* * * * *